June 26, 1928.  
J. T. SMITH  
1,675,280  
REFRIGERATING CABINET AND METHOD OF REFRIGERATING ELONGATED BODIES  
Filed July 31, 1926
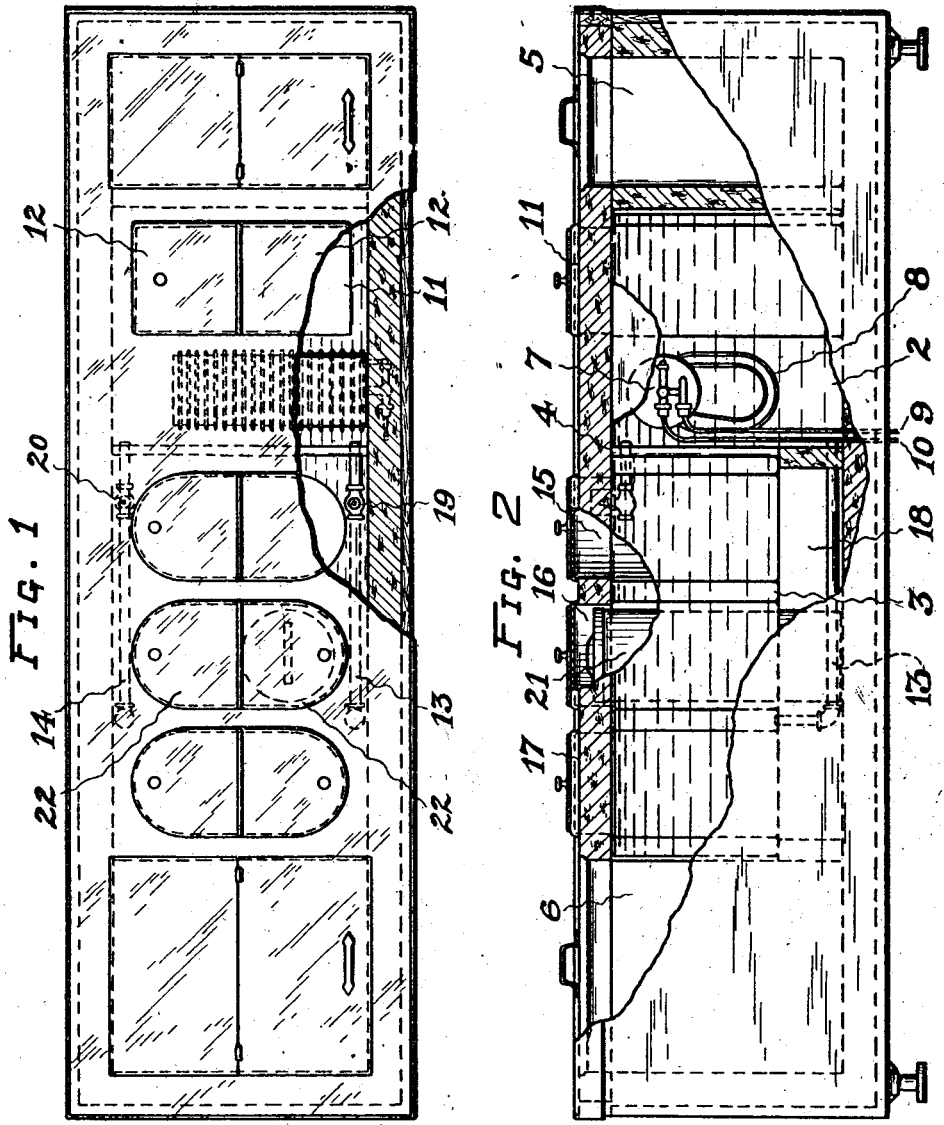
INVENTOR  
James T. Smith  
BY Evans & McCoy  
ATTORNEY Patented June 26, 1928.

1,675,280

UNITED STATES PATENT OFFICE.

JAMES T. SMITH, OF CLEVELAND, OHIO, ASSIGNOR TO THE RUSS MANUFACTURING COMPANY, OF CLEVELAND, OHIO, A CORPORATION OF OHIO.

REFRIGERATING CABINET AND METHOD OF REFRIGERATING ELONGATED BODIES.

Application filed July 31, 1926. Serial No. 126,231.

This invention relates to refrigerating cabinets for food and the like and particularly to ice cream cabinets for soda fountain use, including both improvements in the cabinets and an improved method of refrigerating elongated containers of bulk ice cream.

Although this invention is directed broadly to refrigerated cabinets for holding various kinds of foods and other materials at desired low temperatures, the invention is particularly useful in connection with the storing of ice cream for sale by retail dealers.

In the dispensing of bulk ice cream from soda fountains and the like, the ice cream is usually dipped from containers or packers that are stored in a refrigerating cabinet. In cabinets with which applicant is familiar, the temperature of the ice cream at the top of the packer is considerably higher than the temperature of the cream near the bottom of the packer. On very busy days it is desirable to have the ice cream sufficiently soft throughout its entire mass to be rapidly and easily dipped from the packers. The dealers selling a lesser quantity of ice cream prefer, however, to maintain the ice cream harder in order to prevent shrinkage in volume and also in order to conserve the cream for a longer period. The different kinds of ice creams, sherbets and ices also require different storage temperatures for their most satisfactory storage. The usual storage compartment temperatures for bulk ice cream is about 8 to 10 degrees Fahrenheit, whereas sherbets and ices require somewhat lower temperatures for their most desirable storage in bulk. The opinion of different dealers as to the proper dipping temperature for ice cream varies over a considerable range and, therefore, it is desirable to permit each dealer to adjust the temperature of the storage compartments to meet his particular needs and temperature requirements.

In refrigerating compartments for the storage of brick ice cream that is usually protected by a heat insulating carton of paper and the like, a much lower temperature is desirable than with bulk ice cream. Zero degrees Fahrenheit is generally regarded as a satisfactory average temperature for the storage of brick ice cream.

Refrigerating cabinets have been previously proposed for this service in which a separate evaporator was used in each brine tank of different temperature. Thermosiphon circulation of the brine through a cooling coil has also been used to cool water.

The refrigerating unit herein proposed has two brine tanks of different temperatures that are cooled from the same evaporator. The invention also contemplates an improved form of refrigerating cabinet that maintains the top and bottom portions of an ice cream packer, or other elongate container at substantially the same refrigerated temperature. A method of refrigerating elongate masses to substantially the same temperature throughout is also described herein. This is particularly useful in connection with the cooling of bulk ice cream to the same temperature throughout its mass, and is intended to overcome the above objectionable features of conventional ice cream cabinets and to more satisfactorily serve the needs of retail dealers.

One of the objects of the invention is to provide a cabinet of the character specified that has a brine tank for the brick ice cream storage compartment and a second brine tank for the bulk ice cream compartment that are cooled from a single boiler unit and that are independently adjustable as to the temperature maintained therein.

Another object of the invention is to provide a refrigerating cabinet of the above designated character that is adapted to maintain more uniform temperatures throughout the entire body of the refrigerated mass than have heretofore been obtained in cabinets of this character.

Another object of the invention is to provide a cabinet having a storage compartment for containers of bulk ice cream that is cooled through thermosiphon action and that is capable of maintaining the temperature of the top portion of the ice cream container that is placed therein, within very few degrees of the temperature of the intermediate and bottom portions of the ice cream container. The actual difference in temperature is generally only about two or three degrees Fahrenheit.

An additional object of the invention is to provide a low temperature brine tank that contains the refrigerating unit and that provides a low temperature storage compartment, and a slightly higher temperature brine tank of less temperature variation than the low temperature tank, and that is cooled from the single refrigerating unit, the second brine tank being adapted to provide a slightly higher temperature storage compartment.

An additional object of the invention is to provide a method of cooling packers for bulk ice cream and like elongated refrigerated masses, that will maintain the refrigerated mass at more nearly the same temperature throughout the entire mass.

These and other objects of my invention and advantages to be enjoyed from practicing the same will be apparent from a consideration of this specification and the accompanying drawings wherein:

Figure 1 is a top plan view with a portion of the top wall of the brine tanks broken away, of a refrigerating cabinet of the character proposed; and Fig. 2 is a side elevational view with parts of the side wall of the cabinet and of the brine tanks broken away to show more clearly the interior construction of the cabinet shown in Fig. 1.

The refrigerating cabinet that has been selected for the purposes of illustrating and describing the general principles of the invention is lined on all sides by heat insulating material, such as layers of cork or other material, that serves to minimize the absorption of heat by the enclosed brine tanks 2 and 3. The brine tanks are mounted in a separately insulated compartment 4. A storage compartment 5 is arranged at one end of the cabinet and a refrigerator 6 at the other end. The refrigerator compartment is intended for the storage of bottled goods and the like.

The brine tank 2 is preferably substantially filled with brine or other suitable circulating liquid. The term "brine tank" is used herein in its broadest sense to include tanks of any suitable cooling liquid. A refrigerating unit 7 of conventional form, having expansion coils 8, is submerged in the brine tank 2 and connected with a compressor unit (not shown) by outlet and inlet pipes respectively marked 9 and 10.

A suitable food receiving chamber 11, for use as a low temperature storage compartment for brick ice cream and the like, extends downward into the tank 2 and is surrounded on four sides by the brine tank 2. The chamber 11 is thereby maintained at the lowest temperature of the cabinet compartments. A pair of opposed heat-insulated covers 12 of the conventional design are hinged together along their abutting edges to give access to the chamber 11. The chamber 11 preferably extends the full depth of the brine tank.

The refrigerating unit 7 or "boiler" as it is conventionally termed, is automatically controlled so that it maintains the brine bath in the tank 2 between +5° F. and −5° F., a ten degree differential in the brine bath. Materials placed in the compartment 11 will be maintained substantially at 0° F. because of the thermal lag between the brine temperature and the temperature of the stored material. This is a suitable temperature for the storage of brick ice cream.

The second or supplemental brine tank 3 is connected to the main brine tank 2, which contains the refrigerating unit, by a pair of brine circulation pipes 13 and 14, one of which is positioned along each side of the tank in order that the connections will be offset from the food chambers 15, 16 and 17 that respectively extend completely through the supplemental brine tank and open into an underlying air chamber 18. The top of the brine tank 3 is connected to the top of the tank 2 through a pair of adjustable valves 19 and 20 that control the rate of circulation of brine from the tank 2 through the tank 3 and again into the tank 2.

The application of this system of cooling the brine of tank 3 insures more uniform temperature of the brine in the supplemental tank than is obtained by the use of separate cooling units in each tank. The most rapid circulation of the brine through the tank 3 will occur when the temperature of tank 2 is a minimum, thus circulating the coldest brine much more rapidly than the warmer brine. As the temperature of tank 2 rises, the rate of circulation of brine through tank 3 is retarded in accordance with the temperature differential. This variation of temperature in tank 2 depends upon the cut out and cut in temperatures of the cooling unit which in the illustrative installation selected is about 10° F. This arrangement, therefore, tends to maintain the temperature of tank 3 more uniform than that of tank 2.

Particular attention is invited to the use of a brine tank 3 in the bulk ice cream storage portion of the cabinet that is raised considerably above the bottom of the cabinet, and that is of materially less depth than the tank 2, the difference in temperature between the brine in the bottom of the supplemental tank and in the top thereof is of more nearly the same temperature than in tanks of greater depth.

The compartments or food chambers 15, 16 and 17 are particularly arranged to receive bulk ice cream packers 21 of the character shown in the drawing. These packers or food receiving receptacles are generally arranged in pairs, two packers being stored in each food chamber and rendered readily available for the dispensing of ice cream therefrom by the pairs of head-insulated opposed lids 22.

The ice cream is dispensed from these containers in small amounts by the retail dealer.

Each packer or container extends completely through the supplemental brine tank 3 into the underlying cold air chamber 18. By interconnecting the food chambers through the cold air chambers the temperatures of all of the chambers are rendered more nearly the same. Heat is readily absorbed from the metal container of the ice cream. The rate of cooling of the packers is, of course, most rapid over the central zone of the ice cream packers because of its close proximity of the enclosing side walls of the brine tank. By changing the dimension of the air chamber underlying the brine tank 3 or forming a continuation of the food chamber, various gradations in the temperature between the top and bottom of the ice cream can be obtained, it being possible in this way to regulate the temperature of the ice cream in the bottom of the container relative to the ice cream in the top portion or central zone of the container by this means. In other words, by the exercise of this invention, the refrigerated mass of ice cream, or other material can be maintained at a substantially uniform temperature throughout its mass.

The particular dimensions of the air chamber 18 for the most satisfactory temperature conditions in the body of the refrigerated mass can readily be determined by experiment. This relation is generally found to be of about the proportions shown in the selected embodiment of the invention although the specific proportions may vary over a considerable range depending upon various factors.

The method herein proposed of removing a greater quantity of heat from one part of the elongated refrigerated mass than from other portions and of interchanging heat between the lower portions of a plurality of such packers by means of a different and separate fluid medium provides a method of maintaining the temperature of the entire mass substantially the same throughout.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A refrigerating cabinet for foods and the like comprising a main brine tank, an open topped food chamber extending downward into said tank and laterally surrounded by the prine therein, means in said tank for cooling the brine therein, and a second brine tank adjacent the main tank and connected thereto adjacent the bottom and the top for effecting thermosiphon circulation of brine between the two tanks, said main and second brine tanks being of different depths and said second brine tank also having a food chamber extending downward into it.

2. A refrigerating cabinet for foods and the like comprising a main brine tank, an open topped food chamber extending downward into said tank and laterally surrounded by the brine therein, means in the tank for cooling the brine therein, a second brine tank adjacent the main tank and connected thereto adjacent the top and bottom to provide thermosiphon circulation of brine between the two tanks, the connection between the two tanks being so arranged that the brine from the main tank enters the second tank at points well removed from the ends of the second tank, a food chamber also extending downward into said second tank, said second brine tank being of materially less depth than said main tank, and adjustable valve means interposed in the connection between the tanks for controlling the temperature differential between the two tanks.

3. A refrigerating cabinet for foods and the like comprising a main brine tank, an open topped food chamber extending downward into said tank and laterally surrounded by the brine therein, means in said tank for cooling the brine therein, a second brine tank adjacent the main tank and connected thereto adjacent the bottom and the top for effecting thermosiphon circulation of brine between the two tanks, said second tank being provided with a plurality of open topped food chambers extending completely therethrough and opening at the bottom into an intercommunicating air chamber underlying said second tank.

4. A refrigerated cabinet for foods and the like comprising in combination a main brine tank of predetermined operating range of temperature having a food compartment extending thereinto, a supplemental brine tank of materially less depth than the main tank and connected adjacent its top and bottom respectively to said main tank to provide thermosiphon circulation of brine therebetween whereby said brine circulates more rapidly as the temperature of said main tank dec..ses to maintain the brine in said supplemental tank materially more constant in temperature than the brine of said main tank and at a somewhat higher mean temperature, said supplemental tank also having a plurality of food compartments for receiving elongated food receptacles extending well below the bottom of said supplemental tank whereby a material portion of each elongated food receptacle placed within said compartments extends well below the bottom of said supplemental tank.

5. A refrigerated cabinet for foods and the like comprising a main brine tank having a food compartment extending thereinto and surrounded laterally thereby, means adjustably maintaining the temperature of the brine in said main tank within predetermined temperature limits, a supplemental brine tank of materially less depth than the main tank connected adjacent the top and bottom to said main tank to provide thermosiphon circulation of brine therebetween whereby said brine circulates more rapidly as the temperature of the main tank decreases to maintain the temperature of the brine of the supplemental tank more uniform than the temperature of the main tank, means for adjustably controlling the rate of thermosiphon circulation between said two tanks, a food compartment extending completely through said supplemental tank and well below the bottom thereof whereby a food compartment of substantially the same depth as the compartment of the main tank is formed in the supplemental brine tank, the bottom of the supplemental tank being disposed well above the bottom of the main tank.

6. A storage cabinet for bulk ice cream packers and like food receiving receptacles comprising a heat insulated chamber, a brine tank arranged within said chamber and spaced a material distance from the bottom thereof, a plurality of food receiving compartments extending completely through said brine tank, a fluid medium contained within the bottom portion of said chamber below the brine tank and in heat interchanging relation with each food receiving receptacle in order to maintain substantially the same temperature in the top and bottom of said food receptacles and to maintain all of the food receptacles at the same temperature.

7. A heat insulated refrigerating cabinet having a plurality of food receiving compartments formed therein for receiving separate food receptacles, a refrigerated brine tank of materially less depth than said food receptacles associated with the upper portions of said food receptacles, a fluid medium surrounding the lower portions of said receptacles, the lower portions of said receptacles being disposed in heat interchanging relation with respect to the fluid medium surrounding each of the receptacles whereby said receptacles are cooled and maintained at a substantially constant temperature throughout their length by said cabinet.

8. A refrigerated cabinet for foods and the like comprising a main brine tank of predetermined operating temperature range having a food compartment extending thereinto and surrounded laterally by said tank, a supplemental brine tank of materially less depth than the main tank arranged with its top at substantially the same elevation as the top of the main tank and connected at its top and bottom respectively with said main tank for thermo-siphon circulation of brine between said tanks whereby the temperature of the brine in the supplemental tank is maintained at less temperature variation than the temperature variation of the main tank, a plurality of food receiving compartments extending completely through the supplemental tank, a single air compartment underlying said supplemental tank and extending substantially to the level of the bottom of the main tank, each of said food compartments of said supplemental tank opening into said air chamber whereby materials placed within the food compartments of said supplemental tank are subjected to the heat interchanging influence of air in the aforesaid air chamber, the food compartments for said supplemental tank being of substantially the same depth as the compartment of the main tank and the bottom of the supplemental tank being disposed well above the bottom of the main tank.

9. A refrigerated cabinet for foods and the like comprising a main brine tank maintained within a predetermined operating range of temperature and having a food compartment extending thereinto, a supplemental brine tank of materially less depth than the main tank arranged with its top at substantially the same level as the top of the main tank and connected at its top and bottom respectively to the main tank for thermo-siphon circulation of brine between said tanks whereby the temperature of the brine in the supplemental tank is maintained at less temperature variation than the temperature of the main tank, a plurality of food receiving compartments extending completely through the supplemental tank for receiving a plurality of food receptacles, said supplemental brine tank being of materially less depth than said receptacles, a fluid medium surrounding the lower portions of said receptacles underlying said supplemental brine tank, the lower portions of said receptacles being each disposed in heat interchanging relation with respect to the fluid medium surrounding each of the receptacles whereby said receptacles are maintained at substantially uniform temperature throughout their length.

10. A refrigerating cabinet comprising, a main brine tank, a second brine tank of less depth than the first, a food receptacle extending into each brine tank, means for cooling the brine in the main tank, and means connecting said tanks for effecting thermosiphon circulation of brine between the tanks.

11. A refrigerating cabinet comprising, a main brine tank, a second brine tank of less depth than the main tank, a food receptacle extending into each tank to substantially the same depth, brine cooling means in the main tank, means connecting the second tank adjacent the top and bottom thereof to the first tank for effecting thermosiphon circulation of brine between the tanks, and means for regulating the aforesaid circulation of brine between said tanks to thereby regulate the temperature of the brine in the second tank.

12. A refrigerating cabinet comprising a main brine tank, a second brine tank of less depth than the first, a food receptacle extending into each brine tank, the food receptacle of the second brine tank extending well below the bottom thereof, brine cooling means in the main tank adjacent the top thereof, a connection between the brine tanks adjacent the liquid level of each and other connections therebetween extending from the main tank to a point adjacent the bottom of the second brine tank and opening into the second tank at a point well removed from the side of the second tank adjacent the main tank for thermosiphon circulation of brine between the two tanks, and means for regulating the rate of circulation of the brine between the two tanks.

13. The method of maintaining a substantially uniform temperature throughout a plurality of elongated bulk ice cream packers that consists in cooling only the upper zone of said packers by means of one fluid medium and interchanging heat between the lower portions of said packers through a separate and different fluid medium.

In testimony whereof I affix my signature.

JAMES T. SMITH.